United States Patent [19]
Müller et al.

[11] 3,743,829
[45] July 3, 1973

[54] ROTARY HOLDER FOR LIGHTING FITTINGS

[75] Inventors: Jupp Müller; Harald Reigler, both of Neheim-Husten, Germany

[73] Assignee: Trilux-Lenze KG, Heidestrasse Neheim-Husten, Germany

[22] Filed: July 8, 1971

[21] Appl. No.: 160,670

[30] Foreign Application Priority Data
July 11, 1970 Germany.............. P 20 34 517.9

[52] U.S. Cl. .......................... 240/153, 240/51.11 R
[51] Int. Cl. ............................................. F21v 17/00
[58] Field of Search................ 240/153, 52.1, 51.11, 240/128; 277/207, 211

[56] References Cited
UNITED STATES PATENTS

| | | |
|---|---|---|
| 3,283,145 | 11/1966 | Muller ............................... 240/128 |
| 3,348,035 | 10/1967 | Franklin............................... 240/25 |
| 3,228,039 | 1/1966 | Freeman........................... 277/207 X |
| 2,386,257 | 10/1945 | Muller ............................ 277/207 X |
| 3,555,543 | 1/1971 | Lynch........................... 240/51.11 R |

Primary Examiner—Samuel S. Matthews
Assistant Examiner—Monroe H. Hayes
Attorney—Markva & Smith

[57] ABSTRACT

A rotary holder for lighting fittings, comprising an outside member with an operating lever and an inside member with a carrier arm, interconnected through an opening in the casing of a fitting in which the assembled members can turn. The opening in the casing is closed and made dustproof by an annular sealing edge on the outside member bearing on the casing around the opening.

11 Claims, 11 Drawing Figures

Patented July 3, 1973

INVENTOR.
JUPP MÜLLER and HARALD RIEGLER
BY Markva + Smith
ATTORNEYS

INVENTOR.
JUPP MÜLLER and HARALD RIEGLER
BY Markva + Smith
ATTORNEYS

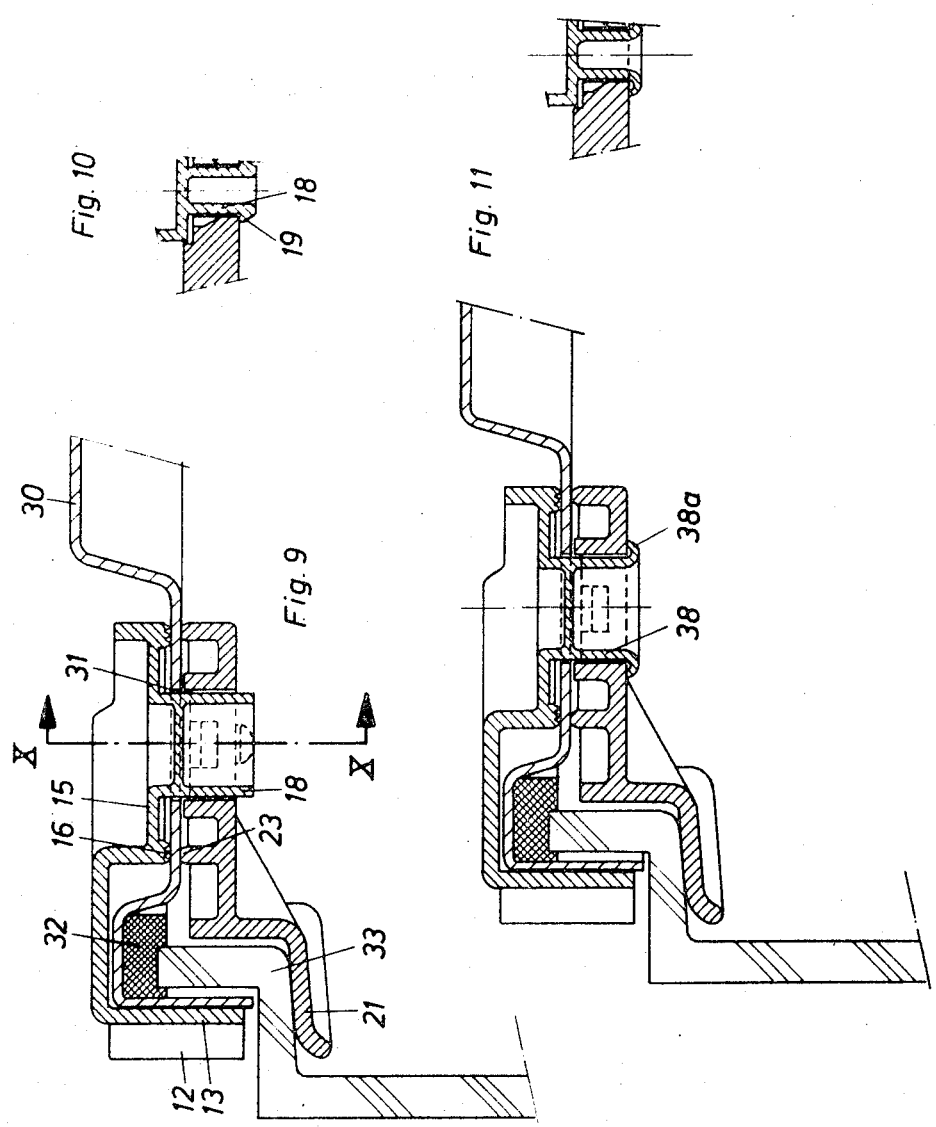

3,743,829

ROTARY HOLDER FOR LIGHTING FITTINGS

BACKGROUND OF THE INVENTION

This invention relates to a rotary holder for lighting fittings of the kind comprising an outside member provided with an operating lever and an inside member provided with a carrier arm, said two members being connected together through an opening in the casing of a fitting, in which they are rotatable.

Rotary holders for lighting fittings of the specified kind have in the past been made of metal. The hole that is required in the casing for mounting the holder prevents conventional rotary holders for lighting fittings from being dustproof.

SUMMARY OF THE INVENTION

It is an object of the present invention to provide a rotary holder for lighting fittings that is dustproof.

Another object of the invention is so to contrive the holder that the parts are simpler to assemble and cheaper to produce than the parts of conventional holders.

To attain these objects the present invention provides a rotary holder for lighting fittings, comprising an outside member with an operating lever and an inside member with a carrier arm, interconnected through an opening in the casing of a fitting in which the assembled members can turn, wherein said opening in said casing is closed and made dustproof by an annular sealing edge on said outside member bearing on said casing around said opening.

The outside member of the holder may be a plastics molding formed integral with the annular sealing edge in the form of a lipped seal.

BRIEF DESCRIPTION OF THE DRAWINGS

Two embodiments of the invention will now be described by way of example and with reference to the accompanying drawings, in which:

FIG. 9 is an axial section showing the two members interconnected and assembled with the fitting;

FIG. 10 is a section taken on the line X — X of FIG. 9, and

FIG. 11 is a cross section of a modification of the embodiment shown in FIG. 9.

DESCRIPTION OF THE PREFERRED EMBODIMENTS

Figure 1:
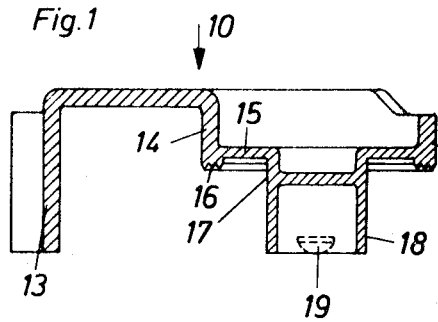
FIGS. 1 to 4 show an embodiment of the outside member of a rotary holder according to the invention, in the form of different sections and a plan view.
Figure 3:
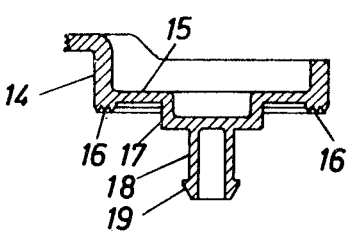
Figure 2:
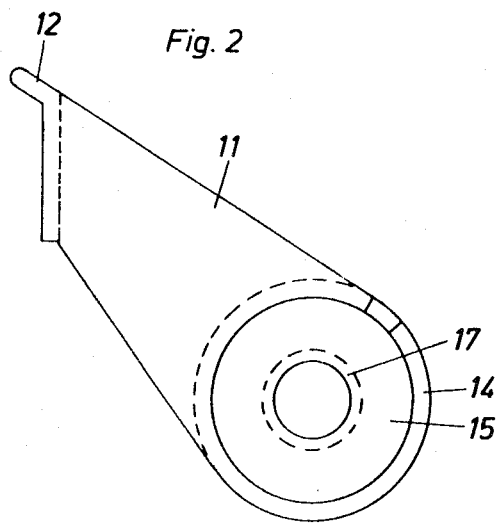
Figure 4:
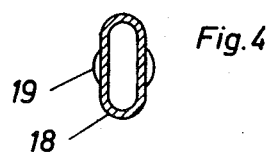

An embodiment of the outside member 10 of a rotary holder according to the invention will first be described with reference to FIGS. 1 to 4. This outside member 10 is a plastics molding formed with an operating lever 11 comprising a manipulating fin 12 and a flange 13. In the assembled position the flange 13 bears against the circumference of the metallic lamp casing 30 (FIG. 9). 14 is a collar which serves for rigidification, and which as a downward extension forms a sealing edge 16 resembling a lipped seal. As is evident from the drawings, sealing edge 16 includes annular ridges and grooves which form a saw-toothed or serrated configuration. This type configuration is referred to as a labyrinth seal. 17 is a circular bush corresponding to a circular opening in the lamp casing 30. A horizontal annular portion 15 of appropriate flexibility connects the circular bush 17 and the collar 14. An oval push-in sleeve 18 is arranged below the circular bush 17 and formed with self-engaging projections 19.

Figure 5:
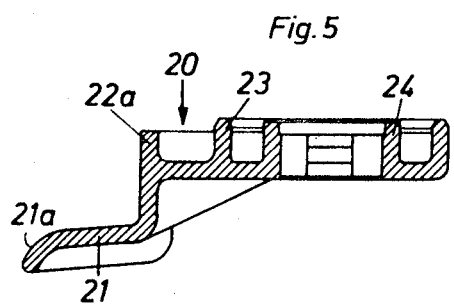
FIGS. 5 to 8 show the inside member, in the form of different sections and a plan view.
Figure 6:
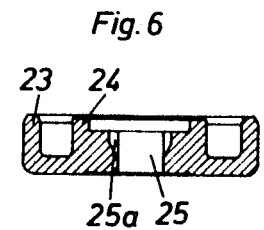
Figure 7:
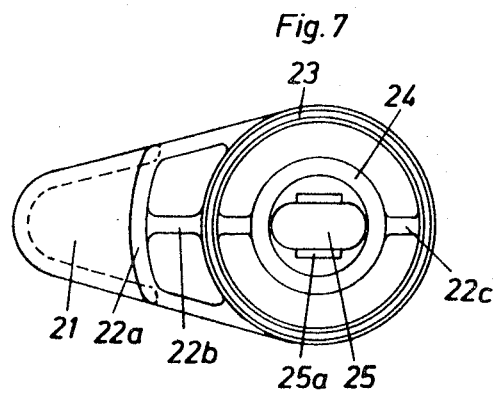
Figure 8:
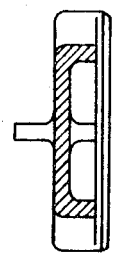

The inside member 20 which is illustrated in FIGS. 5 to 8 is likewise a plastics molding. 21 is a carrier arm which has a slide-in face 21a. These parts engage the underside of the edge of say a globe and hold it. 22a, 22b and 22c are reinforcing ribs. 23 is an annular projection on the inside member 20 which cooperates with the sealing edge 16 on the outside member 10. The inside member 20 also comprises a circular guide ring 24, an oval socket 25 and ramps 25a formed inside the oval socket 25.

The outside and inside members are shown attached to a lighting fitting in FIG. 9. In this Figure the reference numeral 31 denotes a circular opening in the lamp casing 30. 32 is a seal and 33 is a globe. When the rotary holder is closed the flange 13 of the operating lever 11 bears against the periphery of the lamp casing 30 and the carrier arm 21 of the inside member 20 engages the underside of a horizontal portion of the globe 33. The globe 33 has a vertical neck which bears against the seal 32 from below.

The outside and inside members are interconnected through the circular opening 31 provided in the lamp casing 30, the oval push-in sleeve 18 of the outside member engaging in the oval socket 25 of the inside member 20. The two members are held together because the projections 19 snap over the lower edge of the oval socket 25 as will be understood by reference to FIG. 10. As is evident in the drawings, the collar portion 14 extends toward the inside member 20 by an amount sufficient to cause the annular sealing edge 16 to be movably disposed against the surface of the casing 30 when the outside and inside members are interconnected. Engagement generates the necessary axial thrust for the lipped seal to bear firmly against the lamp casing 30 and to maintain the desired dustproof seal in any position as well as during rotation. The annular portion 15 provides a flexible intermediate member which is capable under axial pressure of slightly deforming towards the circular opening 31 in the lamp casing 30. This ensures that the lipped seal will continue to make good contact even when manufacturing tolerances, for instance with regard to the gauge of the metal, vary. The annular projection 23 on the inside member 20 provides a countersurface for the lipped seal.

The holder is assembled by fitting the two members together. When the projections 19 ride up the ramps 25a in the oval socket 25 the walls of the oval push-in sleeve 18 of the outer member yield slightly inwards. Finally the projections 19 snap into engagement in the illustrated coupling position. The rotary holder is rotatable because the circular bush 17 of the outside member 10 lies in the circular opening 31 of the lamp casing 30 and projects a short distance into a circular recess in the inside member 20, as will be understood by reference to FIG. 10.

FIG. 11 illustrates a different embodiment. In this arrangement the outside and inside members are held together by the edge 38a of a push-in sleeve 38 having been riveted over the lower edge of the oval socket of the inside member.

The advantage of the rotary holder for lighting fittings according to the invention is that it creates a reliable dustproof seal. The holder can be economically produced because it consists of only two moldings. The elements needed for forming the dustproof seal may be integrally molded with the principal moldings. Assembly is simply by forcing the two members together. Tools are not needed.

In a further modification of the invention the inside member 20 could be made of spring steel to make the carrier arm 21 more elastic.

The invention may be embodied in other specific forms without departing from the spirit or essential characteristics thereof. The embodiments are therefore to be considered in all respects as illustrative and not restrictive.

What is claimed is:

1. A rotary holder for holding lighting fittings in a lamp casing comprising:
   a. an outside member having an operating lever,
   b. an inside member having a carrier arm, and
   c. means for interconnecting said outside and inside members through an opening in said casing whereby said members can be rotated as a unit,
   d. said interconnecting means including an internally closed sleeve formed on said outside member and having a non-circular configuration, a non-circular opening formed in the inside member and sized to receive said sleeve, and means for attaching said sleeve to the inside member when inserted through said non-circular opening,
   e. said outside member including an annular sealing edge to be disposed against the surface of said casing to provide a seal around said opening whereby dust particles are prevented from entering said casing.

2. A rotary holder as defined in claim 1 wherein said attaching means includes projections formed near one end of said sleeve and arranged to extend beyond the edge of said non-circular opening.

3. A rotary holder as defined in claim 2 wherein the inner surface of said non-circular opening includes ramps formed at locations corresponding with said projections whereby the sleeve may be easily pushed through said non-circular opening.

4. A rotary holder as defined in claim 1 wherein said attaching means includes a rolled edge formed on one end of said sleeve whereby the rolled edge overlaps the edge of the opening in said inside member.

5. A rotary holder for holding lighting fittings in a lamp casing comprising:
   a. an outside member having a single piece construction and including an operating lever, a push-in sleeve portion and an annular collar portion including a sealing edge located around said sleeve portion, and
   b. an inside member having a carrier arm and means to effect an interconnection with said push-in sleeve portion so that the members can be rotated as a unit within an opening in said lamp casing,
   c. said collar portion extends toward the inside member an amount sufficient to cause said annular sealing edge to be movably disposed against the surface of said casing when the outside and inside members are interconnected to provide a seal around said opening whereby dust particles are prevented from entering said casing.

6. A rotary holder as defined in claim 5 wherein the annular sealing edge includes a serrated configuration to form a labyrinth seal between the holder and the casing.

7. A rotary holder as defined in claim 5 wherein said inside member includes an annular projection arranged to contact the inside surface of said casing at a location directly opposite the sealing edge on said outside member.

8. A rotary holder as defined in claim 5 wherein said interconnection means includes an opening formed in the inside member to receive the end of the push-in sleeve portion and the push-in sleeve portion is deformable so that it may be inserted into said opening in the inside member.

9. A rotary holder as defined in claim 8 wherein said push-in sleeve portion includes projections which overlap the edge of the opening formed in said inside member to hold the inside and outside members in fixed relationship with respect to each other.

10. A rotary holder as defined in claim 5 wherein said push-in sleeve is closed to prevent matter from passing therethrough.

11. A rotary holder as defined in claim 5 wherein said single piece outside member includes a flexible annular portion extending between the annular collar portion and the push-in sleeve portion to bias the sealing edge against the casing surface.

* * * * *

UNITED STATES PATENT OFFICE
CERTIFICATE OF CORRECTION

Patent No. 3,743,829            Dated July 3, 1973

Inventor(s) Jupp Müller; Harald Riegler

It is certified that error appears in the above-identified patent and that said Letters Patent are hereby corrected as shown below:

The last name of the second inventor has been spelled incorrectly. In item [75] the correct spelling is

RIEGLER

Signed and sealed this 27th day of November 1973.

(SEAL)
Attest:

EDWARD M. FLETCHER, JR.       RENE D. TEGTMEYER
Attesting Officer                Acting Commissioner of Patents